Figures 1, 2:
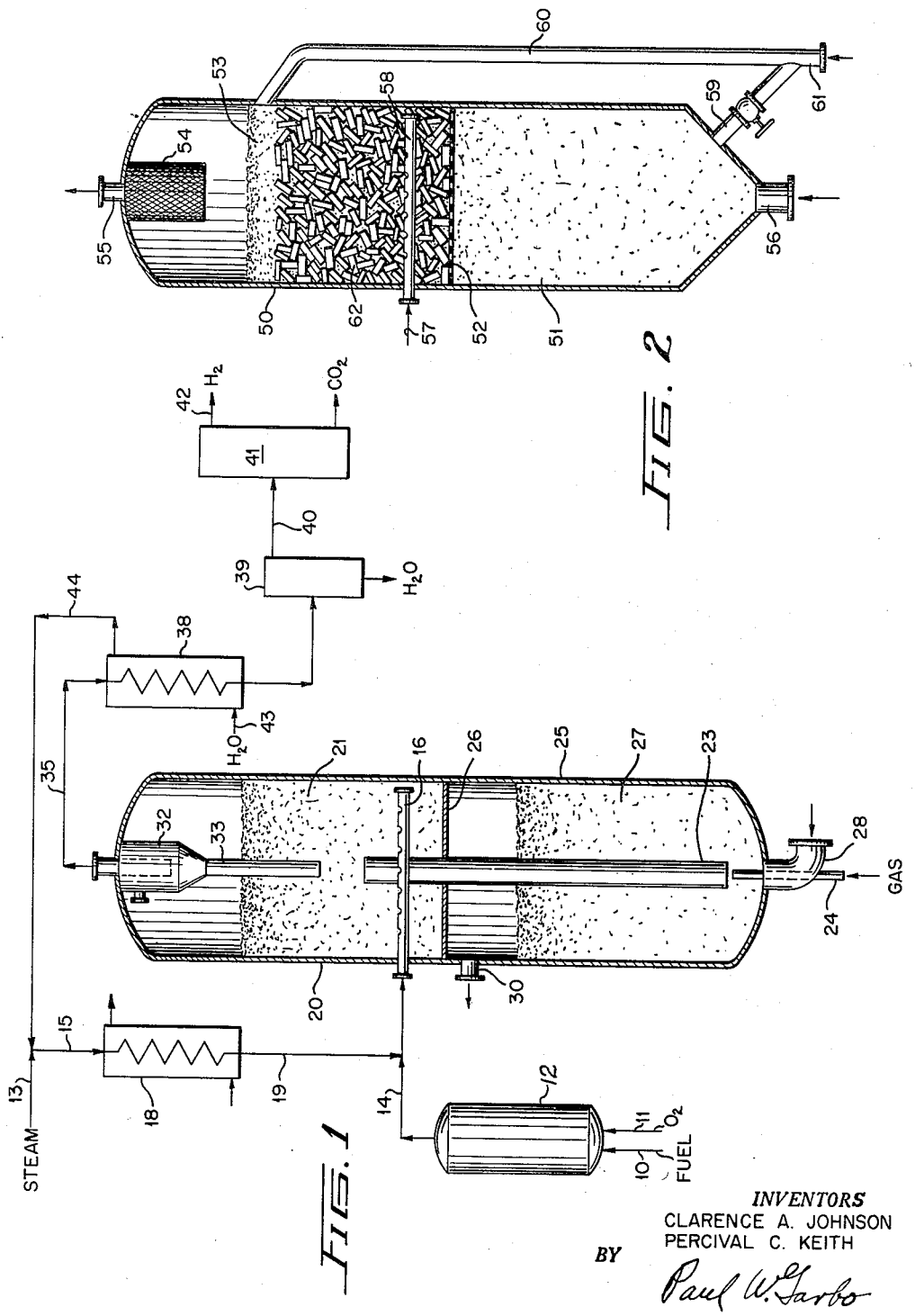

Nov. 15, 1960  C. A. JOHNSON ET AL  2,960,388
SHIFT REACTION WITH FLUIDIZED CATALYST
Filed Dec. 17, 1956

INVENTORS
CLARENCE A. JOHNSON
PERCIVAL C. KEITH
BY
Paul W. Garbo
AGENT

United States Patent Office 2,960,388
Patented Nov. 15, 1960

2,960,388

SHIFT REACTION WITH FLUIDIZED CATALYST

Clarence A. Johnson, Princeton, and Percival C. Keith, Peapack, N.J., assignors to Hydrocarbon Research, Inc., New York, N.Y., a corporation of New Jersey Filed Dec. 17, 1956, Ser. No. 628,647

4 Claims. (Cl. 23—213)

The present invention relates to a process for the production of hydrogen and carbon dioxide by passing a mixture of gases containing carbon monoxide and steam over a catalyst at elevated temperatures. More particularly, it relates to such a process wherein the catalyst is maintained as a fluidized bed of finely divided solid particles.

It is well known that hydrogen and carbon dioxide may be produced by contacting a gaseous mixture containing carbon monoxide and steam with a catalyst at elevated temperatures in the range of 600° F. to 1000° F. This is commonly referred to as the "shift" reaction and proceeds according to the following equation:

$$CO + H_2O \rightleftharpoons CO_2 + H_2$$

The carbon monoxide for the feed gas used in this process is commonly derived from a synthesis gas which may be produced by the partial combustion at elevated pressures of hydrocarbons with oxygen. Details of a typical partial combustion process of this type are set forth in U.S. Patent 2,491,518 which is owned by applicants' assignee. The partial combustion process produces a synthesis gas containing primarily a mixture of hydrogen and carbon monoxide along with minor amounts of carbon dioxide, methane, heavy hydrocarbons, sulfur-containing compounds and other materials which may be present in the reactants, such as nitrogen.

Because of the presence of some of these substances in synthesis gas, it has heretofore been necessary to wash the gas prior to its entry into the shift reaction zone. Without such scrubbing, carbon would deposit on the catalyst in the shift reaction zone. With the catalyst, which has heretofore been used in the form of a fixed bed of small particles, accumulating carbon or other contaminants, the bed not only loses catalytic activity but also becomes plugged so that it is then necessary to interrupt the shift reaction in order to replace or regenerate the catalyst bed.

Since it has been important to keep any material out of the shift reaction zone which may tend to accumulate on or deactivate the catalyst, it has been necessary, not only to scrub the synthesis gas before it enters the shift zone, but also to restrict the type of hydrocarbon feed used in making synthesis gas.

A major problem and economic disadvantage in the scrubbing operation is that synthesis gas, which is hot as produced, is cooled and must be reheated before entering the shift reaction zone. Thus, a considerable amount of sensible heat in the synthesis gas leaving the partial combustion zone is lost in the scrubbing operation.

Accordingly, an object of this invention is to provide a process for the conversion of carbon monoxide with steam to carbon dioxide and hydrogen wherein the reacting gases may contain appreciable amounts of carbon and other impurities which would normally deactivate and plug a fixed bed of shift catalyst.

Another object is to provide a process for the conversion of carbon monoxide and steam to carbon dioxide and hydrogen which takes advantage of the sensible heat in hot gases containing carbon monoxide.

Still another object is to provide a continuous process for the conversion of carbon monoxide and steam into carbon dioxide and hydrogen wherein the shift catalyst may be continuously regenerated, thus avoiding plugging of the catalyst bed and shutting down of the shift reactor.

These and other objects and advantages of the invention will become apparent from the description which follows.

Essentially, the present invention involves the catalytic "shift" conversion of carbon monoxide and steam into carbon dioxide and hydrogen at elevated temperatures by passing the gaseous reactants up through a fluidized bed of finely divided shift catalyst. The catalyst in the fluidized bed may be continuously or periodically withdrawn and returned after regeneration. Therefore, the shift reactor need not be shut down in order to effect catalyst reactivation. Moreover, an operation in which the shift catalyst may be readily regenerated, frequently or continuously, permits the economic utilization of feed gases containing carbon monoxide admixed with normally troublesome amounts of carbon, sulfur and other contaminating or deactivating materials. It is, therefore, not necessary to scrub the feed gases before they enter the shift reaction zone and the sensible heat of such gases, usually generated at high temperatures, is utilized rather than wasted.

Referring now to the appended drawing, Figure 1 shows diagrammatically one preferred embodiment of the invention. A hydrocarbon fuel stream and an oxygen-containing gas are supplied by lines 10 and 11, respectively, to a partial combustion zone 12 wherein synthesis gas containing relatively large amounts of carbon monoxide and hydrogen is generated. The effluent mixture of carbon monoxide and hydrogen containing carbon particles, unconsumed hydrocarbons and sulfur compounds flows from zone 12 through line 14 and distributor 16 into reaction zone 20.

Steam supplied by way of lines 13 and 44 enters heater 18 through line 15 and there it is heated to the desired shift reaction temperature before passing through line 19 to mix with the synthesis gas. The mixed reactants then discharge into reaction zone 20 containing a fluidized bed 21 of finely divided water-gas shift catalyst. Shift catalysts are well known in the art and may, for example, comprise a mixture of a major amount of iron oxide and a minor amount, usually 1 to 15% by weight, of chromium oxide. Catalysts of this type are described in detail in U.S. Patents 2,602,020 and 2,631,086.

The catalyst is maintained in the fluidized state by the upwardly flowing gases in contact therewith while steam or other transport gas passed up through line 23 from line 24 conveys catalyst from regeneration zone 25 to reaction zone 20 separated by partition 26 from regenerator 25. An oxygen-containing gas such as air enters a dense, fluidized catalyst bed 27 in regenerator 25 through inlet 28 and regeneration product gases leave through outlet 30.

Entrained catalyst particles are separated from the shift reaction gases leaving bed 21 by cyclone separator 32 and are returned to that bed through standpipe 33. The gases pass from separator 32 through line 35 to condenser 38 which condenses water vapor present in the reaction gases. Condensed water is eliminated at separator 39 while the gases flow through line 40 into scrubbing system 41 wherein carbon dioxide is removed from the gases. Any known scrubbing medium for absorbing carbon dioxide may be used in scrubbing system 41, such as diethanolamine, hot potassium carbonate, acetone or methanol. Residual hydrogen-containing gas leaves scrubber 41 through line 42 and may go to storage or to a further purification stage prior to utilization.

Condenser 38 may be used as a heat exchanger to heat the water which is to provide a portion of the steam supplied to shift reaction zone 20. Thus, water from line 43 may be partially heated in condenser 38, passed through line 44 and thence combined with steam added through line 13.

Figure 2 shows a form of unitary apparatus containing a shift reaction zone and a regeneration zone, which is alternative to the unitary apparatus containing reaction zone 20 and regeneration zone 25 of Figure 1. Comparing the apparatus of Figure 2 with that of Figure 1, it will be observed that reaction zone 50 is separated from subjacent regeneration zone 51 only by perforated plate 52. Thus, the regeneration product gases flow up from zone 51 through perforated plate 52 into zone 50 where they become mixed with the synthesis gas which is being reacted with steam. All of the mixed gases emerge from the fluidized bed 53 of shift catalyst, pass through screen or filter 54 which prevents entrained catalyst particles from leaving the apparatus, and exit through outlet 55.

Air, oxygen-enriched air or oxygen is supplied to regeneration zone 51 by way of inlet 56 to burn off the impurities deposited on the catalyst particles by the synthesis gas which admixed with steam is introduced into shift reaction zone 50 through line 57 and distributor 58. Regenerated catalyst flows from the fluidized mass in zone 51 through valved draw-off line 59 into transport line 60 whence it is conveyed to reaction zone 50 by a gas stream entering at inlet 61. The fluidized catalyst moves downwardly through zone 50 and perforated plate 52 into regeneration zone 51 to complete the circulation of the catalyst through the apparatus.

A very important difference between reaction zone 50 of Figure 2 and reaction zone 20 of Figure 1 is that zone 50 contains a fixed bed 62 of packing material such as Raschig rings and Berl saddles. Fixed bed 62 limits the random movements of the catalyst particles permeating bed 62 so that a restrained fluidization of the catalyst is effected in zone 50. Surprisingly enough, higher conversions of carbon monoxide by reaction with steam to carbon dioxide and hydrogen are achieved with restrained fluidization of the shift catalyst in packed zone 50 than with freely fluidized catalyst in unpacked zone 20 of Figure 1.

Although the shift reaction temperature range may be broadly between 700 and 1000° F., a temperature in the range of 800 to 950° F. is generally preferred. While the equilibrium constant of the shift reaction increases with decreasing temperature, the rate of reaction falls off. Accordingly, the selected reaction temperature should take into account both factors. Because of the sensitivity of iron oxide-chromium oxide catalysts to excessive temperatures, it is desirable to maintain the temperature in the regeneration zone between 900 and 1200° F. and preferably not above 100° F. The pressure is preferably in the range of 200 to 400 pounds per square inch gauge (p.s.i.g.), although it may vary from atmospheric pressure to 800 p.s.i.g. The space velocity of the carbon monoxide-containing gas, on a dry basis, is desirably between 4 and 40 and preferably between 6 and 20 cubic feet of gas (measured at standard conditions) per hour per pound of catalyst. The superficial velocity of this gas together with added steam through the fluidized catalyst bed is usually in the range of 0.2 to 2 feet per second and is preferably between 0.4 and 1.2 feet per second.

The volume of steam fed to the shift reaction zone is preferably in the range of 3 to 10 times the volume of carbon monoxide in the feed gas. If too much steam is added, the process becomes more costly, while keeping the steam to carbon monoxide ratio below the preferred range tends to diminish the extent of the shift reaction.

*Examples*

Several runs were made in a pilot-scale fluidizing reactor using as feed stock synthesis gas produced by the partial combustion of methane with high-purity oxygen. The gas was fed directly into the fluidizing reactor without scrubbing or other pretreatment.

The fluidized bed in the reactor was a mass of finely divided particles of a Girdler shift catalyst. This is a material containing a major amount of iron oxide and a minor amount (of the order of 1 to 15% by weight) of chromium oxdie. The catalyst may be formed from a mixture of the metal oxides containing small amounts of lubricants and water, as set forth, for example, in U.S. Patent 2,602,020. As used in carrying out these examples of the invention, the catalyst was in a finely divided form, all passing through an 80-mesh screen and about 70% by weight passing through a 100-mesh screen. Analysis of the catalyst showed, on a moisture-free basis, iron oxide and chromium oxide contents of 83.8% and 10.8% by weight, respectively.

The results of four runs made with this catalyst are noted in the table below. Each column shows the data averaged for a four-hour period of operation. Run Nos. 1 and 3 were conducted with the shift catalyst in a freely fluidized state, while in run Nos. 2 and 4 restrained fluidization of the catalyst was effected in a fixed bed of Raschig rings (1½ inch size).

| Run No | 1 | 2 | 3 | 4 |
|---|---|---|---|---|
| Shift Temperature, °F | 852 | 905 | 950 | 824 |
| Shift Pressure, p.s.i.g | 304 | 378 | 305 | 367 |
| Space Velocity of Synthesis Gas (dry basis), standard cubic feet per hour per pound of catalyst | 19.2 | 13.8 | 14.0 | 11.5 |
| Volume Ratio of Steam to Carbon Monoxide | 5.7 | 5.8 | 8.3 | 4.6 |
| Superficial Gas Velocity, feet per second | 0.59 | 0.37 | 0.59 | 0.42 |
| Synthesis Gas Analysis (dry basis), mol percent: | | | | |
| $H_2$ | 61.4 | 61.5 | 60.8 | 61.0 |
| $CO$ | 35.6 | 35.4 | 35.9 | 35.8 |
| $CO_2$ | 2.4 | 2.4 | 2.4 | 2.4 |
| $CH_4$ | 0.5 | 0.6 | 0.7 | 0.6 |
| $N_2$, A, etc | 0.1 | 0.1 | 0.2 | 0.2 |
| Shifted Gas Analysis (dry basis), mol percent: | | | | |
| $H_2$ | 67.9 | 70.7 | 69.0 | 69.5 |
| $CO$ | 4.9 | 2.3 | 2.6 | 2.6 |
| $CO_2$ | 24.0 | 26.0 | 24.9 | 26.4 |
| $CH_4$ | 0.4 | 0.4 | 0.7 | 0.5 |
| $N_2$, A, etc | 2.8 | 0.6 | 2.8 | 1.0 |

From the shifted gas analyses, it is evident that on the order of 90% of the carbon monoxide passed through the shift reaction zone was converted to hydrogen and carbon dioxide in every run except run No. 1 where a lower conversion resulted from a higher space velocity. It will also be noted in the table that at comparable space velocities, restrained fluidization runs Nos. 2 and 4 gave somewhat higher conversions using lower temperatures than the conversion of freely fluidized run No. 3 requiring a higher temperature.

The shifted gas may, as already indicated, be scrubbed to remove susbtantially all of the carbon dioxide present. Where a hydrogen-containing gas of very low carbon monoxide content is desired, the shifted gas, after being scrubbed for carbon dioxide removal, may again be passed through a shift reaction zone pursuant to this invention to convert approximately 90% of the residual, unconverted carbon monoxide to additional hydrogen and carbon dioxide, the latter being eliminated by a second scrubbing operation, if desired.

While synthesis gas produced by the partial combustion of hydrocarbons with oxygen will, on a dry basis, usually contain over 30% by volume of carbon monoxide, synthesis gas made by other methods will generally have carbon monoxide contents in the approximate range of 25 to 50% by volume. All such gases are suitable feed stocks for this invention. The shifted product gases, after removing the bulk of the carbon dioxide therein, may again be processed in accordance with the invention to effect further conversion of residual carbon monoxide to hydrogen. Accordingly, the process of the invention is suitable for gases containing as little as 2 to 5% by volume of carbon monoxide and the shifted gases will have only a fractional percentage of residual carbon monoxide.

In regenerating the shift catalyst by burning tars, soot, sulfur compounds and other contaminants which are introduced into the fluidized mass by the untreated synthesis gas, not only is the catalyst maintained in a state of high activity, but also the heat of the regeneration may be utilized in the process. Thus, heat exchange tubes may be disposed in the regenerator in contact with the fluidized catalyst. Steam may be generated in these tubes for the dual purpose of controlling the temperature of regeneration below that temperature at which the catalyst is thermally deactivated and of supplying at least part of the steam required in the shift reaction zone.

In view of the various modifications of the invention which will occur to those skilled in the art upon consideration of the foregoing disclosure without departing from the spirit or scope thereof, only such limitations should be imposed as are indicated by the appended claims.

What is claimed is:

1. The process of producing hydrogen by the partial combustion of a hydrocarbon fuel with oxygen to yield hot synthesis gas containing large amounts of carbon monoxide and hydrogen along with a minor amount of soot particles, passing said hot synthesis gas with said soot particles and added steam in the volume proportion in the range of 3 to 10 times the carbon monoxide of said hot synthesis gas up through a fluidized bed of shift catalyst to effect reaction between said carbon monoxide and said steam, maintaining said fluidized bed in a reaction zone having a fixed packing material disposed therein, and withdrawing from the top of said fluidized bed a hydrogen-enriched gaseous product.

2. The process of claim 1 wherein said shift catalyst with said soot particles associated therewith is withdrawn from the lower portion of said fluidized bed, the withdrawn shift catalyst is regenerated by combustion of said soot particles associated therewith, and the regenerated shift catalyst is returned to the upper portion of said fluidized bed.

3. The process of claim 2 wherein said shift catalyst is regenerated while being maintained in a fluidized state.

4. The process of claim 3 wherein the gaseous products of combustion formed during regeneration flow up through said fluidized bed.

References Cited in the file of this patent

UNITED STATES PATENTS

| | | |
|---|---|---|
| 2,178,833 | Erasmus | Nov. 7, 1939 |
| 2,183,301 | Bossner et al. | Dec. 12, 1939 |
| 2,425,754 | Murphree et al. | Aug. 19, 1947 |
| 2,631,086 | Moak et al. | Mar. 10, 1953 |
| 2,637,625 | Garbo | May 5, 1953 |
| 2,692,192 | Martin | Oct. 19, 1954 |

OTHER REFERENCES

Kalbach: "Chem. Eng.," pages 105–108, January 1947.

Altieri: Gas Analysis and Testing of Gaseous Materials, p. 42, American Gas Assoc., New York, 1945.

UNITED STATES PATENT OFFICE
CERTIFICATION OF CORRECTION

Patent No. 2,960,388                      November 15, 1960

Clarence A. Johnson et al.

It is hereby certified that error appears in the above numbered patent requiring correction and that the said Letters Patent should read as corrected below.

Column 3, line 58, for "100° F." read -- 1100° F. --; column 4, line 12, for "oxdie" read -- oxide --.

Signed and sealed this 16th day of May 1961.

(SEAL)
Attest:

ERNEST W. SWIDER                              DAVID L. LADD

Attesting Officer                                 Commissioner of Patents